United States Patent [19]

Hinlein

[11] Patent Number: 4,947,275

[45] Date of Patent: Aug. 7, 1990

[54] DETACHABLE HEAD-LOAD BEAM SLIDER ARM FOR DISK DRIVE

[75] Inventor: Sigmund Hinlein, Sudbury, Mass.

[73] Assignee: Digital Equipment Corp., Maynard, Mass.

[21] Appl. No.: 172,288

[22] Filed: Mar. 23, 1988

[51] Int. Cl.⁵ .............................. G11B 5/48; G11B 5/50
[52] U.S. Cl. ..................................... 360/104; 360/106
[58] Field of Search ................. 360/104, 105, 106, 109

[56] References Cited

U.S. PATENT DOCUMENTS

| | | | |
|---|---|---|---|
| 3,846,835 | 11/1974 | Horovitz et al. | 360/103 |
| 4,387,409 | 6/1983 | Otavsky et al. | 360/104 |
| 4,535,374 | 8/1985 | Anderson et al. | 360/103 |
| 4,578,726 | 3/1986 | Boehm et al. | 360/105 |
| 4,605,979 | 8/1986 | Inoue et al. | 360/105 |
| 4,797,763 | 1/1989 | Levy et al. | 360/104 |

FOREIGN PATENT DOCUMENTS

| | | | |
|---|---|---|---|
| 0208280 | 7/1986 | European Pat. Off. | |
| 0136978 | 7/1985 | Japan | 360/104 |
| 61-120327 | 6/1986 | Japan | |
| 61-239460 | 10/1986 | Japan | |
| 62-76079 | 4/1987 | Japan | |

OTHER PUBLICATIONS

"Read/Write Air Lubricated Head Position Retention Means," Harison et al., Defensive Publication No. 628018 (U.S. Patent Office), Nov. 5, 1968.

Barnard, "Clamping of Read-Write Heads", IBM TDB, Sep. 1968, vol. 11, No. 4, p. 362.

Primary Examiner—David J. Severin
Attorney, Agent, or Firm—Fish & Richardson

[57] ABSTRACT

An assembly for mounting a head in a disk drive (such as a disk reader or servowriter), comprising a detachable load beam slider arm adapted to carry the head on a distal end thereof, and an actuator arm including a resilient clamp for releasably attaching the proximal end of the load beam slider arm to the actuator arm. Thus, the head may easily be removed and/or replaced simply by removing the head and load beam slider arm as a unit from the actuator arm and replacing it with another head-load beam slider arm unit.

24 Claims, 3 Drawing Sheets

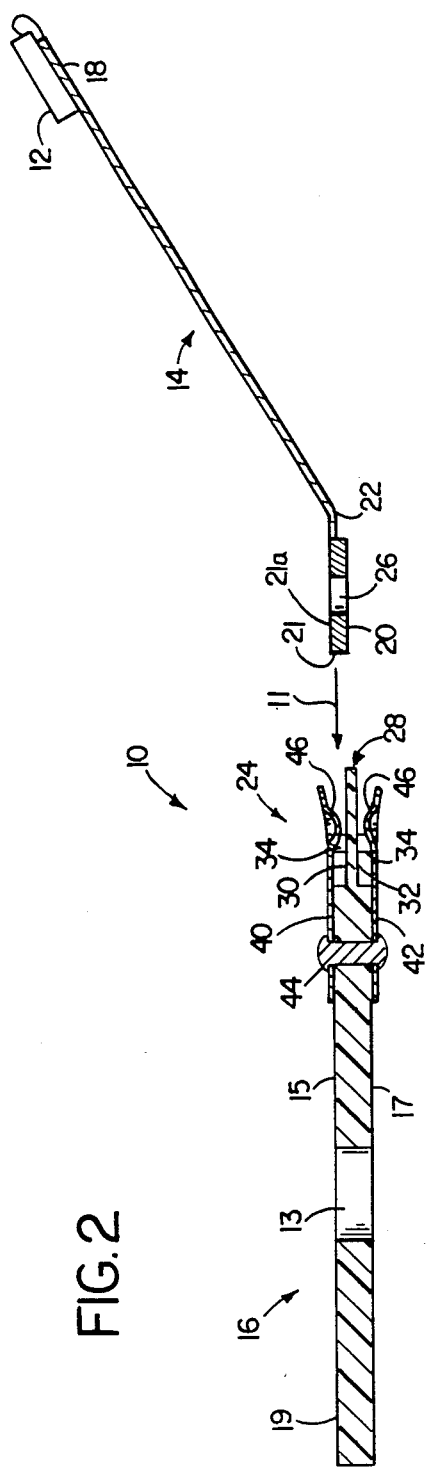
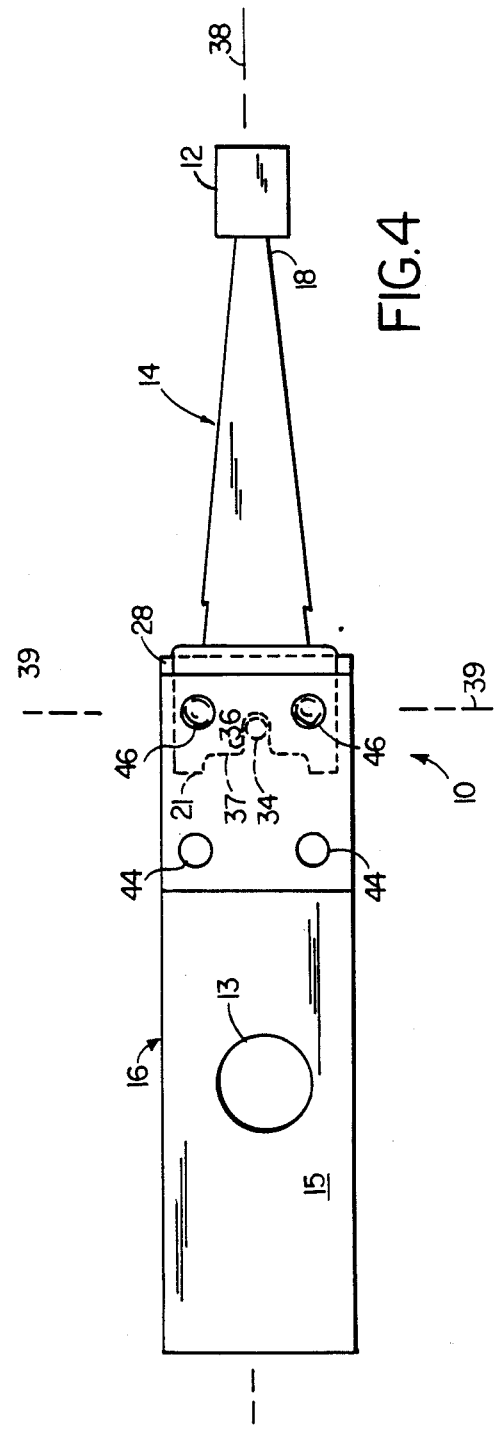

DETACHABLE HEAD-LOAD BEAM SLIDER ARM FOR DISK DRIVE

BACKGROUND OF THE INVENTION

This invention relates to mounting a load beam slider arm, to which a head is attached, in a disk drive, such as a disk reader or a servowriter.

As is known, in a disk drive, a head, such as a magnetic head, for reading data from or writing information onto the disk is typically mounted on one end of a load beam slider arm. The other end of the load beam slider arm is secured to an actuator arm, which is in turn coupled to the drive shaft of a motor, such as a servo or stepping motor. The head is moved to a selected track on the disk by the motor via the actuator and load beam slider arms.

One known way of securing the load beam slider arm to the actuator arm is by gluing the arms together. In a second method, known as "ball staking" the arms are attached by placing a hollow metal sleeve through aligned holes in the actuator and load beam slider arms and expanding the sleeve by driving a ball bearing therethrough. Yet another method of securing the arms together is to mount the load beam slider arm to the actuator arm with one or more screws.

SUMMARY OF THE INVENTION

The invention features, in a first aspect, an assembly for mounting a head in a disk drive, comprising a detachable arm having a distal end adapted to carry the head, and a mounting arm including a resilient clamp for releasably attaching a proximal end of the detachable arm to the mounting arm. Thus, the head may easily be removed and or replaced simply by removing the head and detachable (i.e. load beam slider arm as a unit from the mounting (i.e. actuator) arm and replacing it with another head-load beam slider arm unit. The entire mounting assembly need not be replaced as in prior mounting assemblies in which the load beam slider arm was permanently fastened to the actuator arm by gluing or "ball staking". Further, time consuming replacement of the load beam slider arm and head using special tools (as was required to gain access to screws securing load beam slider arms to actuator arms in multiple disk assemblies) is eliminated, because the mounting assembly of the invention allows removal and replacement of the head simply by withdrawing the old head-load beam slider arm unit and inserting a new one.

Preferred embodiments include the following features. The resilient clamp comprises a resilient member disposed on a first surface of the mounting arm to releasably clamp the proximal end of the detachable arm between the resilient member and a second surface of the mounting arm. The resilient member preferably is a leaf spring. The second surface preferably is recessed from the first surface to provide a slot-shaped cavity for receiving the proximal end of the detachable arm. The mounting arm and detachable arm are also axially aligned with respect to a common axis. Preferably, axial alignment is achieved by a pair of bosses disposed on the resilient member releasably engaging a corresponding pair of depressions disposed on the proximal end of the detachable arm. The detachable arm and mounting arm are also laterally aligned on a common axis, preferably by a projection disposed on the mounting arm engaging a slot disposed in the proximal end of the detachable arm when the clamp releasably secures the detachable arm to the mounting arm. In one embodiment, a second resilient clamp is included for releasably attaching a proximal end of a second head-carrying arm to the mounting arm. The second resilient clamp likewise comprises a resilient member, which is disposed on a third surface of the mounting arm, for releasably clamping the proximal end of the second head-carrying arm between the resilient member and a fourth surface of the mounting arm. The fourth surface is preferably recessed from the third surface to provide a slot-shaped cavity for receiving the proximal end of the second head-carrying arm.

In a second aspect, the invention features a head mounting assembly comprising a pair of detachable arms, each arm being adapted to carry one of a pair of heads on a distal end thereof, and a mounting arm including a pair of resilient clamps for releasably attaching proximal ends of the pair of detachable arms to the mounting arm.

Preferred embodiments include the following features. The mounting arm has a predetermined thickness, with an end of the mounting arm having a reduced thickness from the predetermined thickness to form a shelf extending from the end. The pair of releasable clamps comprise a pair of resilient members fastened to an upper surface and a lower surface, respectively, of the mounting arm, each resilient member forming, with the shelf, one of the pair of resilient clamps. The mounting arm and each detachable arm are radially aligned along an axis. Preferably, radial alignment is achieved by a pair of bosses, disposed either on each one of the pair of resilient members or on the proximal end of each one of the pair of detachable arms, respectively, for engaging a pair of depressions, disposed on the proximal end of each one of the pair of detachable arms or on each one of the pair of resilient members, respectively. The mounting arm and the pair of detachable arms are also laterally aligned along an axis. Preferably, lateral alignment is achieved by a pair of projections, disposed either on the end of the mounting arm or on the proximal end of each one of the pair of detachable arms, respectively, engaging a pair of slots, disposed either on the proximal end of each one of the pair of detachable arms or the end of the mounting arm, respectively.

In a third aspect, the invention features a disk drive comprising a pair of disks disposed in spaced, coaxial relationship, a pair of heads for communicating with the pair of disks, a pair of detachable supporting arms, each supporting arm having one of the pair of heads secured to a distal end thereof, and a mounting arm for the pair of detachable arms, the mounting arm comprising a pair of resilient clamps for releasably attaching proximal ends of the pair of detachable arms to the mounting arm. With this arrangement, either of the heads may easily be removed and or replaced by removing that head and the associated supporting (i.e. load beam slider) arm as a unit from the mounting (i.e. actuator) arm by disengaging the appropriate resilient clamp. Thus, unlike prior multiple disk assemblies in which one or more non-defective heads had to be removed to provide access to the load beam slider arm to which the defective head was attached (for example, by screws), the present invention permits the defective head to be replaced as a unit with its load beam slider arm without having to remove any other head or load beam slider arm.

In a fourth aspect, the invention features a method of mounting and replacing a head in a disk drive, the head being attached to a distal end of a supporting arm, comprising the steps of resiliently and releasably clamping the proximal end of the supporting arm to a mounting arm in a predetermined, fixed position within a mounting cavity, removing the supporting arm from the mounting arm by withdrawing the proximal end of the supporting arm from the mounting cavity, inserting the proximal end of a replacement supporting arm, carrying a respective head, into the mounting cavity on the mounting arm, and resiliently and releasably clamping the proximal end of the replacement arm in the predetermined, fixed position within the mounting cavity.

Other features and advantages of the invention will be apparent from the following detailed description, and from the claims.

DESCRIPTION OF THE PREFERRED EMBODIMENT DRAWINGS

We first briefly describe the drawings.

FIG. 2 is a cross-sectional view of the mounting assembly of FIG. 1 taken along line 2—2.

FIG. 4 is a plan view of the mounting assembly of FIG. 1, with the load beam slider arm shown attached to the actuator arm.

STRUCTURE AND OPERATION

Figure 1:
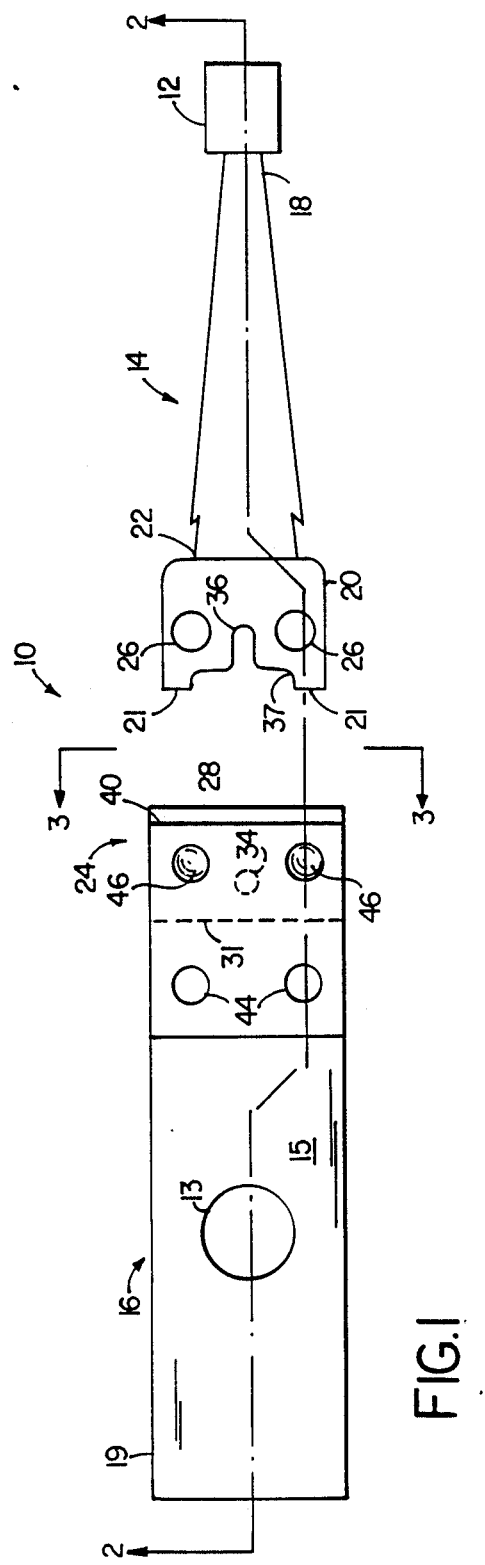
FIG. 1 is a plan view of the head mounting assembly of the invention, with the load beam slider arm shown detached from the actuator arm.
Figure 3:
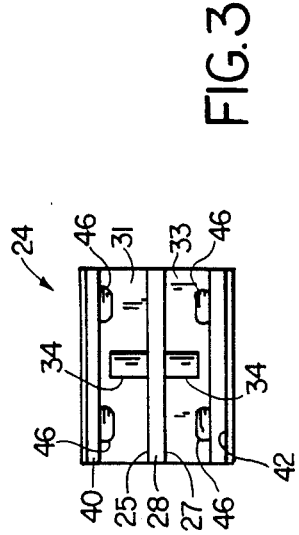
FIG. 3 is a slightly expanded end view of the actuator arm of FIG. 1, taken from line 3—3.

Referring to FIGS. 1–4, mounting assembly 10 for mounting magnetic head 12 within a disk drive (such as a disk reader or servowriter) comprises detachable load beam slider arm 14 for carrying and supporting magnetic head 12, and actuator arm 16 for supporting and moving load beam slider arm 14 and head 12 among selected tracks on a magnetic disk (not shown) in response to an actuation mechanism, such as a motor (also not shown) (for example, a servomotor or a stepping motor). Magnetic head 12 comprises any suitable head for communicating with the magnetic disk in a conventional manner, such as by writing mapping information on the disk (as in a servowriter) or reading data from the disk (as in a disk reader).

Magnetic head 12 is fastened to a distal end 18 of load beam slider arm 14 by epoxy. Load beam slider arm 14 is a resilient metal (such as stainless steel) member, the distal end of which is relatively thin to reduce the total mass of load beam slider arm 14 and to allow a stream of air which passes between the slider and the disk during disk rotation to lift head 12 sufficiently to space the head from the disk surface. This protects head 12 from damage caused by the rotating disk surface. The proximal end of load beam slider arm 14 forms a base 20 disposed at an angle with respect to distal end 18 through a bend region 22, which serves to resiliently urge head 12 against the disk surface when the disk is at rest. Bend region 22 of distal end 18 is spot welded to base 20. Base 20 is approximately 0.4 inches in length and is somewhat thicker than distal end 18 (here between about 0.01 and 0.02 inches thick) and a pair of depressions 26 are disposed in base 20 for purposes to be discussed. Here, depressions 26 take the form of two holes drilled through base 20. Holes 26 are spaced apart by about 0.25 inches. An alignment slot 36, approximately 0.1 inches wide, is disposed in base 20 at the lateral center thereof. Alignment slot 36 is recessed from the front surface 21 of base 20 by a wider slot 37, which is about ¾ of the total width of base 20. Both slots 36, 37 extend through the entire thickness of base 20.

Actuator arm 16 has a relatively thick (here about 0.06 inches thick) proximal end 19 and is fabricated from aluminum to reduce its mass and thus allow arm 16 to be rapidly moved to position head 12 among various tracks on the disk during operation. Actuator arm 16 may also have one or more through holes 13 disposed therein to further reduce the mass of actuator arm 16 while retaining its rigidity. The upper surface 25 of actuator arm distal end 24 is recessed (here by grinding) from the upper surface 15 of proximal end 19 to provide a slot-shaped cavity 30 in distal end 24 bounded by surface 31. The lower surface 27 of distal end 24 is similarly recessed from the lower surface 17 of actuator arm proximal end 19 to thereby form a slot-shaped cavity 32 bounded by surface 33. Distal end 24 thus comprises a shelf 28 of reduced thickness (here between about 0.02 and 0.03 inches thick) from proximal end 19 and formed integrally therewith. Slot 30 is adapted to receive load beam slider arm base 20, and thus has a depth and length approximately equal to the thickness and length, respectively, of base 20. Slot 32 is likewise adapted to receive a base of another load beam slider arm (not shown).

A pair of post-shaped projections 34 are disposed on upper surface 25 and lower surface 27 of shelf 28 at the lateral centers thereof. Posts 34 are circular, having a diameter slightly smaller than the width of alignment slot 36, and here are pressed into shelf 28. The height of posts 34 should be slightly less than the thickness of base 20, for reasons to be explained.

Actuator arm 16 also includes a pair of resilient members or "load springs" 40, 42 fastened to upper and lower surfaces 15, 17, respectively, by a pair of rivets 44. Load springs 40, 42 each are fabricated as leaf-type springs from spring steel, between about 0.010 and 0.015 inches in thickness, to provide a spring force of between 3 and 4 pounds per square inch. Load springs 40, 42 are approximately as wide as cavities 30, 32 (i.e. as wide as actuator arm 16). Each load spring 40, 42 has a pair of dimples stamped therein to form a pair of rounded bosses 46. Bosses 46 on load spring 40 are spaced about 0.25 inches apart and extend into the cavity 30 to engage the pair of holes 26 disposed in the base 20 of load beam slider arm 14. That is, load spring 40 is a spring clip which forms a resilient clamp with shelf 28 to releasably secure load beam slider arm 14 to actuator arm 16 by a "snap-in" action of bosses 46 in holes 26. Load spring 42 also forms a resilient clamp with shelf 28 to releasably secure another load beam slider arm in cavity 32. The reduced height of posts 34 prevents accidental interference with the clamping action of springs 40, 42.

Load beam slider arm 14 is attached to actuator arm 12 by moving load beam slider arm 14 toward actuator arm 16 in the direction of arrow 11, and inserting the base 20 of load beam slider arm 14 into slot 30. Base front surface 21 and top surface 21a slide along the rounded surfaces of bosses 46, urging load spring 40 away from shelf 28 and allowing load beam slider arm 14 to be further inserted into slot 30. If load beam slider arm 14 is laterally aligned with the longitudinal axis 38 of actuator arm 16, post 34 will enter alignment slot 36, allowing base 20 to be completely inserted in slot 30. If load beam slider arm 12 is laterally misaligned, post 34 will engage either surface 21 or the rearward edge of slot 37, preventing full assembly of load beam slider arm 14 and actuator arm 16 until the user laterally aligns load beam slider arm 14 with axis 38. The engagement of post 34 with alignment slot 36 laterally aligns arms 14, 16 (and hence head 12) on common longitudinal axis 38 (FIG. 4).

With load beam slider arm 14 and actuator arm 16 laterally aligned and base 20 fully inserted in slot 30, the pair of load spring bosses 46 engage the pair of load beam slider arm holes 26. The resiliency of load spring 40 forces bosses 46 into holes 26, thereby clamping load beam slider arm 14 between spring 40 and shelf 28. At this time, load beam slider arm front surface 21 abuts surface 31 at the proximal end of cavity 30. The presence of slot 37 minimizes the width of surface 21 that abuts surface 31 and thus helps in squaring base 20 within slot 30. Holes 26 and bosses 46 are aligned along an axis 39 disposed perpendicularly to the longitudinal axis 38 of arms 14, 16. Thus, the engagement of bosses 46 with holes 26 axially aligns load beam slider arm 14 (and thus head 12) with respect to longitudinal axis 38.

Load beam slider arm 14 may easily be removed from actuator arm 16 by reversing the process described above, that is, by grasping load beam slider arm 14 and pulling it away from actuator arm 16 (i.e., in the opposite direction from arrow 11 of FIG. 2) with sufficient force to overcome the spring tension of load spring 40. Bosses 46 are thus forced out of holes 26 and base 20 removed from slot 30.

The disk is rotated at high speed (for example, 3000 rpm) during operation. A stream of air produced by the rotating disk exerts lift on load beam slider arm 14, overcoming the resilient force of bend region 22 and lifting head 12 slightly away from the surface of the disk. Also, the motor (not shown) which moves head 12 among selected tracks on the disk (via actuator arm 16 and load beam slider arm 14) repositions head 12 as rapidly as possible to improve access time to the data stored on the disk and read by head 12. The torque introduced on load beam slider arm 14, both by the rotation-induced air stream and the rapid repositioning of head 12, is overcome by the spring force exerted by load spring 40 against base 20 of load beam slider arm 14 and the engagement of spring bosses 46 in slider arm holes 26. Thus, the lateral and axial alignment of head 12 on longitudinal axis 38 is securely maintained.

Figure 5:
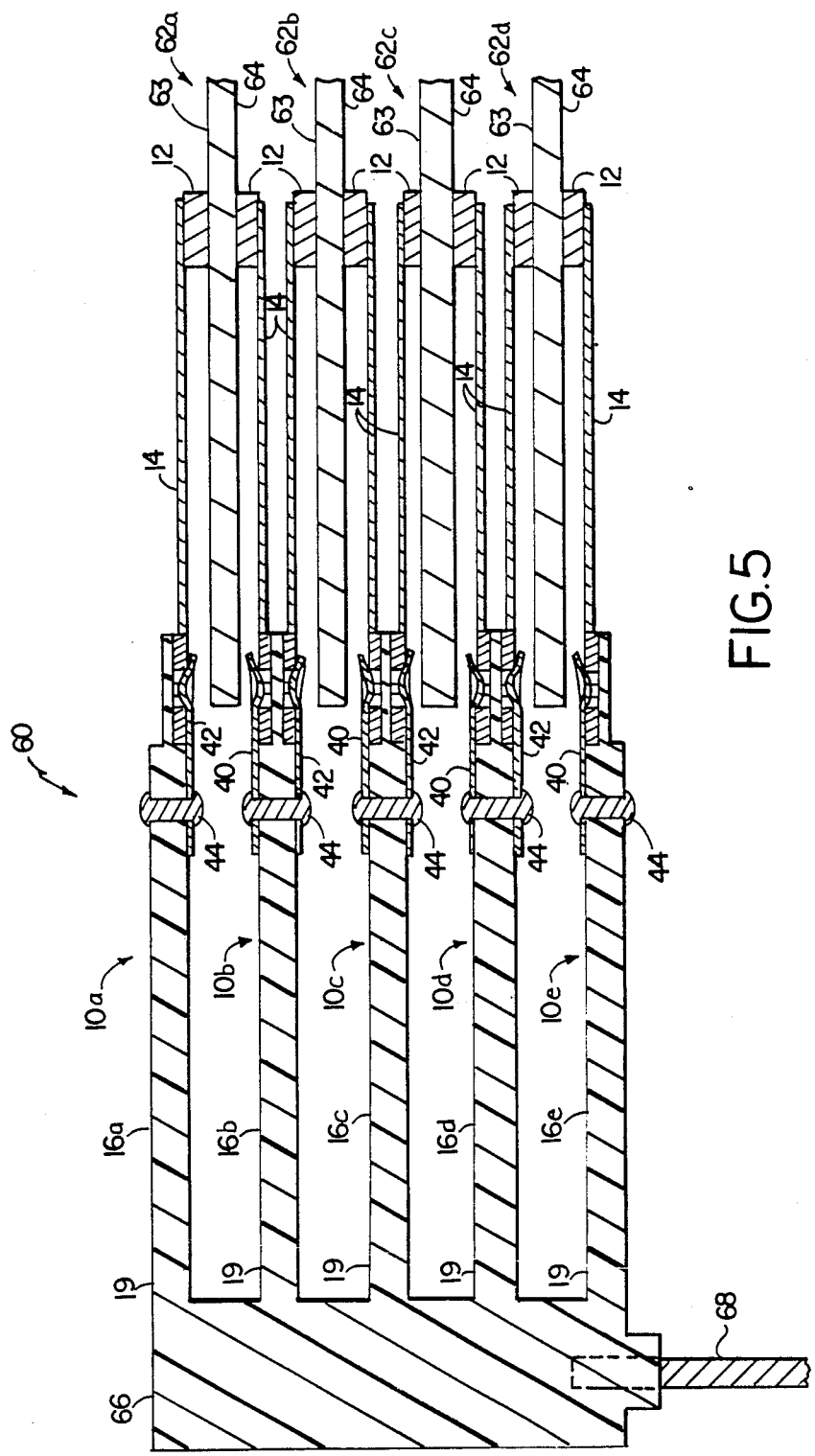
FIG. 5 is a cross-sectional view of the mounting assembly of FIGS. 1–4 assembled in a multiple disk drive.

Referring to FIG. 5, a section of a multiple disk drive 60 comprising four magnetic disks 62a–62d and five mounting assemblies 10a–10e is shown. Mounting assemblies 10a–10e are identical to mounting assembly 10 of FIGS. 1–4, except that the extreme upper and lower actuator arms 16a, 16e each support one magnetic head 12 adjacent to the upper surface 63 and lower surface 64, respectively, of the extreme upper and lower disks 62a, 62d, while the remaining mounting assemblies 10b, 10c, 10d each support a pair of heads 12 adjacent the upper and lower surfaces 63, 64 of adjacent disks. Thus, actuator arms 16b, 16c, 16d each have a pair of load beam slider arms 14 secured thereto (one each in slots 30, 32 by respective load springs 40, 42—FIG. 2), while the uppermost actuator arm 16a has load beam slider arm 14 supported in only slot 30 by load spring 40 and lowermost actuator arm 16e has load beam slider arm 14 secured only in slot 32 by load spring 42.

Preferably, actuator arms 16 are fabricated as a unitary structure with the proximal ends 19 thereof being integrally formed with a base 66 which is rigidly connected to the drive shaft 68 of a servomotor or stepping motor. Thus, as shaft 68 rotates, actuator arms 16a–16e correspondingly move heads 12 in unison across the upper and lower surfaces 63, 64 of disks 62a–62d. During assembly of mounting assemblies 10a–10e, load springs 40, 42 are riveted to actuator arms 16a–16e sequentially, beginning, for example, with the load spring of the lowermost actuator arm 16e. The riveting mechanism is passed through the rivet holes in actuator arms 16a–16d to gain access to arm 16e. After rivets 44 are in place, the riveting assembly is moved up to the next actuator arm 16d, and riveting proceeds until load springs 40, 42 have been riveted to the uppermost actuator arm 16a.

During operation of disk drive 60, if a magnetic head 12 (for example, one of the pair of heads secured to actuator arm 16c) fails, the head is easily replaced by removing the head 12 and load beam slider arm 14 as a unit from actuator arm 16c in the following manner. Base 66 is rotated so that actuator arms 16a–16e are pivoted to the peripheral edge of disks 62a–62d (after a conventional pivot stop has been removed), and a comb (not shown) is inserted between the heads 12 disposed against the upper and lower surfaces 63, 64 of each disk 62a–62d. If the comb is not used, the heads 12 will clap together and be damaged as the assembly is pivoted away from the peripheral edges of disks 62a–62d.

The defective head 12 is replaced simply by pulling the load beam slider arm 14 on which the head is mounted out of the clamp between the load spring and actuator arm in the manner discussed above (after removing the electrical lead of head 12 from its connection in disk drive 60). Then, a new head 12 and load beam slider arm 14 are snapped into the actuator arm in the manner described above. The electrical lead of the new head 12 is then connected in disk drive 60. The multi-arm assembly is pivoted to re-engage heads 12 with surfaces 63, 64 of disks 62a–62d, and the comb is removed.

Other embodiments are within the scope of the following claims. For example, the base 20 of load beam slider arm 14 could alternatively include a pair of detents stamped therein for receiving load spring bosses 46. Also, the bosses may alternately be disposed on base 20, with the holes or detents disposed in the load springs. Additionally, the lateral alignment slot could be disposed in shelf 28 to be engaged by a projection on base 20 to align arms 14, 16 and head 12. Further, the load springs could be fastened to actuator arm 16 by means other than by rivets (e.g., epoxy, screws, etc.). Additionally, posts 34 could be installed through a hole drilled in shelf 28, rather than forming a unitary structure therewith.

What is claimed is:

1. An assembly for mounting a head in a disk drive, comprising
   a detachable arm having a generally planar proximal end and a distal end adapted to carry the head, and
   a mounting arm including a resilient clamp for releasably engaging and securing said planar proximal end between said clamp and the mounting arm.

2. The mounting assembly of claim 1 wherein said resilient clamp comprises a resilient member disposed on a first surface of the mounting arm to releasably clamp the proximal end of the detachable arm between the resilient member and a second surface of the mounting arm.

3. The mounting assembly of claim 2 wherein said resilient member comprises a leaf spring.

4. The mounting assembly of claim 2 wherein said second surface is recessed from said first surface to provide a cavity for receiving said proximal end.

5. The mounting assembly of claim 2 wherein said mounting arm and said detachable arm each are arranged along a longitudinal axis, and further comprising means for aligning the axis of said mounting arm and the axis of said detachable arm in a predetermined relationship.

6. The mounting assembly of claim 5 wherein said alignment means comprises a pair of bosses disposed on said resilient member for releasably engaging a corresponding pair of depressions disposed on the proximal end of the detachable arm.

7. The mounting assembly of claim 2 wherein said mounting arm and said detachable arm each are arranged along a longitudinal axis, and further comprising means for laterally aligning the axis of said detachable arm and the axis of said mounting arm.

8. The mounting assembly of claim 7 wherein said lateral alignment means comprises a projection disposed on said mounting arm and a slot disposed in said proximal end of said detachable arm, said projection engaging said slot when said clamp releasably secures the detachable arm to the mounting arm to laterally align said detachable and mounting arms.

9. The mounting assembly of claim 1 further comprising a second resilient clamp for releasably attaching a proximal end of a second head-carrying arm to said mounting arm.

10. The mounting assembly of claim 9 wherein said second resilient clamp includes a resilient member disposed on a third surface of said mounting arm for releasably clamping said proximal end of the second head-carrying arm between said resilient member and a fourth surface of the mounting arm.

11. The mounting assembly of claim 10 wherein said fourth surface is recessed from said third surface to provide a cavity for receiving the proximal end of said second head-carrying arm.

12. A disk drive comprising
a pair of disks disposed in spaced, coaxial relationship,
a pair of heads for communicating with said pair of disks,
a pair of detachable head-supporting arms, each detachable arm having a generally planar proximal end and having one of the pair of heads secured to a distal end thereof, and
a mounting arm for said pair of detachable arms, said mounting arm comprising a pair of resilient clamps for releasably engaging and securing said planar proximal ends between said clamps and said mounting arm.

13. The disk drive of claim 12 wherein the pair of resilient clamps comprises a pair of resilient members secured to an upper surface and a lower surface, respectively, at an end of said mounting arm.

14. The disk drive of claim 13 wherein the end of said mounting arm includes first and second surfaces recessed from the upper and lower surfaces, respectively, the pair of resilient members releasably clamping the proximal ends of the pair of detachable arms between the pair of resilient members and the first and second recessed surfaces, respectively.

15. The disk drive of claim 14 wherein said mounting arm and said detachable arms are each arranged along a longitudinal axis and each resilient member includes a pair of bosses and the proximal end of each detachable arm has a pair of depressions disposed therein, each pair of bosses being adapted to engage the pair of depressions of the corresponding detachable arm to align the axis of said mounting arm with the axis of each said detachable arm in a predetermined angular relationship.

16. The disk drive of claim 15 wherein
said mounting arm further comprises a pair of protrusions disposed on said first and second surfaces, respectively, and
each said detachable arm further comprises a pair of slots disposed in the proximal end thereof, each protrusion engaging the slot of the corresponding detachable arm to align the axis of each said detachable arm laterally with respect to the axis of said mounting arm.

17. An assembly for mounting a pair of heads in a disk drive, comprising
a pair of detachable arms, each arm having a generally planar proximal end and being adapted to carry one of the pair of heads on a distal end thereof, and
a mounting arm including a pair of resilient clamps for releasably engaging and securing said planar proximal ends between said clamps and said mounting arm.

18. The mounting assembly of claim 17 wherein
said mounting arm has a predetermined thickness, an end of said mounting arm having a reduced thickness from said predetermined thickness to form a shelf extending from said end, and
said pair of resilient clamps comprise a pair of resilient members fastened to an upper surface and a lower surface, respectively, of the mounting arm, each resilient member forming, with said shelf, one of said pair of resilient clamps.

19. The mounting assembly of claim 18 wherein said mounting arm and each said detachable arm are disposed along a longitudinal axis, and further comprising means for aligning the axis of said mounting arm and the axis of each detachable arm in a predetermined angular relationship.

20. The mounting assembly of claim 19 wherein the alignment means comprises a pair of bosses, disposed either on each one of the pair of resilient members or on the proximal end of each one of the pair of detachable arms, respectively, adapted to engage a pair of depressions, disposed on the proximal end of each one of the pair of detachable arms or on each one of the pair of resilient members, respectively.

21. The mounting assembly of claim 18 wherein said mounting arm and each said detachable arm are disposed along a longitudinal axis, and further comprising means for aligning said mounting arm and said pair of detachable arms laterally with respect to each said axis.

22. The mounting assembly of claim 21 wherein said lateral alignment means comprises a pair of projections, disposed either on the end of the mounting arm or on the proximal end of each one of the pair of detachable arms, respectively, adapted to engage a pair of slots, disposed either on the proximal end of each one of the pair of detachable arms or on the end of the mounting arm, respectively.

23. A method of mounting and replacing a head in a disk drive, the head being attached to a distal end of a supporting arm, comprising the steps of resiliently and releasably clamping a planar proximal end of the supporting arm to a mounting arm within a mounting cavity with a clamp that is attached to the mounting arm, removing the supporting arm from the mounting arm by withdrawing the planar proximal end of the supporting arm from the mounting cavity while maintaining the clamp attached to the mounting arm, and inserting the planar proximal end of a replacement supporting arm, carrying a respective head, into the mounting cavity on said mounting arm so that the clamp resiliently and releasably clamps the planar proximal end of said replacement arm within the mounting cavity.

24. The method of claim 23 wherein said supporting arm is disposed along an axis, and said removing step and said inserting step each comprises sliding said supporting arm along said axis.

* * * * *

UNITED STATES PATENT AND TRADEMARK OFFICE
CERTIFICATE OF CORRECTION

PATENT NO. : 4,947,275

DATED : August 7, 1990

INVENTOR(S) : Sigmund Hinlein

It is certified that error appears in the above-identified patent and that said Letters Patent is hereby corrected as shown below:

Column 3, line 55-57; delete "the slider" (line 55) and insert --load beam slider arm 14--.

Column 3, line 56; delete "head 12" and insert --slider arm 14--.

Column 3, line; 56; delete "the".

Signed and Sealed this

Twenty-sixth Day of January, 1993

Attest:

DOUGLAS B. COMER

Attesting Officer     Acting Commissioner of Patents and Trademarks